(12) United States Patent
Dutta et al.

(10) Patent No.: US 11,777,583 B2
(45) Date of Patent: Oct. 3, 2023

(54) BEAM TRAINING RESOURCE SELECTION BY FR2 SIDELINK UE

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Chester, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/137,257

(22) Filed: Dec. 29, 2020

(65) Prior Publication Data

US 2022/0209842 A1 Jun. 30, 2022

(51) Int. Cl.
| | | |
|---|---|---|
| *H04B 7/06* | (2006.01) | |
| *H04W 76/27* | (2018.01) | |
| *H04B 7/08* | (2006.01) | |
| *H04W 16/28* | (2009.01) | |
| *H04W 24/10* | (2009.01) | |

(52) U.S. Cl.
CPC ......... *H04B 7/0695* (2013.01); *H04B 7/0617* (2013.01); *H04B 7/088* (2013.01); *H04W 16/28* (2013.01); *H04W 24/10* (2013.01); *H04W 76/27* (2018.02)

(58) Field of Classification Search
CPC .... H04B 7/0695; H04B 7/0617; H04B 7/088; H04W 16/28; H04W 24/10; H04W 76/27
See application file for complete search history.

(56) References Cited

U.S. PATENT DOCUMENTS

| | | | |
|---|---|---|---|
| 2020/0395993 A1 | 12/2020 | Ryu et al. | |
| 2021/0168574 A1* | 6/2021 | Zhang | .................. H04L 5/0048 |
| 2022/0330038 A1* | 10/2022 | Ganesan | ............... H04W 16/28 |

OTHER PUBLICATIONS

3GPP TSG RAN WG1 Meeting #95 R1-1812308 (Year: 2018).*

(Continued)

*Primary Examiner* — Ricky Q Ngo
*Assistant Examiner* — Stephen N Steiner
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for beam training resource selection by a sidelink UE. A first UE may determine to perform beam training with a second UE in a set of beam training resources. The set of beam training resources may include a first subset of beam training resources for UEs without a RRC connection and a second subset of beam training resources for UEs with a RRC connection, where the first subset of beam training resources and the second subset of beam training resources are non-overlapping. The first UE may determine whether the first UE is RRC connected with the second UE and perform beam training in one of the first subset of beam training resources or the second subset of beam training resources based on whether the first UE is RRC connected with the second UE.

28 Claims, 8 Drawing Sheets

(56) References Cited

OTHER PUBLICATIONS

Huawei, et al., "Beamforming for V2X Sidelink for FR1 and FR2", Draft, 3GPP TSG RAN WG1 Meeting #96, R1-1903075, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, XP051600771, 4 Pages, URL: http://www.3gpp.org/ftp/tsg%5Fran/WG1%5FRL1/TSGR1%5F96/Docs/R1%2D1903075%2Ezip [retrieved on Feb. 15, 2019] p. 1, line 1-p. 3, line 13, whole document, para. sec. 2.1-p. 2, para, sec. 2.2.
International Search Report and Written Opinion—PCT/US2021/057417—ISA/EPO—daed Feb. 25, 2022.
Vivo: "NR Sidelink Synchronization Mechanism", 3GPP Draft, 3GPP TSG RAN WG1 Meeting #95, R1-1812308_NR Sidelink Synchronization Mechanism, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, XP051554213, 8 Pages, URL: https://www.3gpp.org/ftp/tsg_ran/wg1_rl1/TSGR1_95/Docs/R1-1812308.zip, [retrieved on Nov. 11, 2018], Sec. 1, 2.2, 2.3, p. 2, para. sec. 2.1-p. 4, para. sec. 2.2.

\* cited by examiner

BEAM TRAINING RESOURCE SELECTION BY FR2 SIDELINK UE

BACKGROUND

Technical Field

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Each user equipment (UE) of a distributed network may be configured to establish a beam pair link (BPL) with another UE to perform a point-to-point/unicast communication. When a beam quality of the UE degrades, the UE may perform a beam training procedure to improve the beam quality. Some beam training procedures may occur after a random access channel (RACH) procedure, while other beam training procedures may occur before the RACH procedure. Hence, different UEs performing different types of beam training procedures may select the same beam training resources from a set of beam training resources, which may result in interference between the different UEs.

Accordingly, when the UE determines to perform a beam training procedure with another UE, the UE may select beam training resources from a set of beam training resources during a network-wide/system-wide beam training occasion. The set of beam training resources may be partitioned into a first subset of beam training resources and a second subset of beam training resources. The first subset of beam training resources may be used to perform beam training procedures that occur prior to the RACH procedure. For example, the first subset of beam training resources may be used for an initial BPL establishment. The second subset of beam training resources may be used for performing beam training procedures that occur after the RACH procedure. For example, the second subset of beam training resources may be used for beam refinement or beam switching. Based on whether the UE has performed the RACH procedure, the UE may select beam training resources from either the first subset of beam training resources or the second subset of beam training resources to perform a determined beam training procedure.

In an aspect of the disclosure, a method, a computer-readable medium, and an apparatus are provided. The apparatus may be associated with a first UE and may be configured to determine to perform beam training with a second UE in a set of beam training resources, the set of beam training resources including a first subset of beam training resources for UEs without a radio resource control (RRC) connection with a UE associated with the beam training and a second subset of beam training resources for UEs with an RRC connection with the UE associated with the beam training, the first subset of beam training resources and the second subset of beam training resources being non-overlapping; determine whether the first UE is RRC connected with the second UE; and perform beam training in one of the first subset of beam training resources or the second subset of beam training resources based on the determination whether the first UE is RRC connected with the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
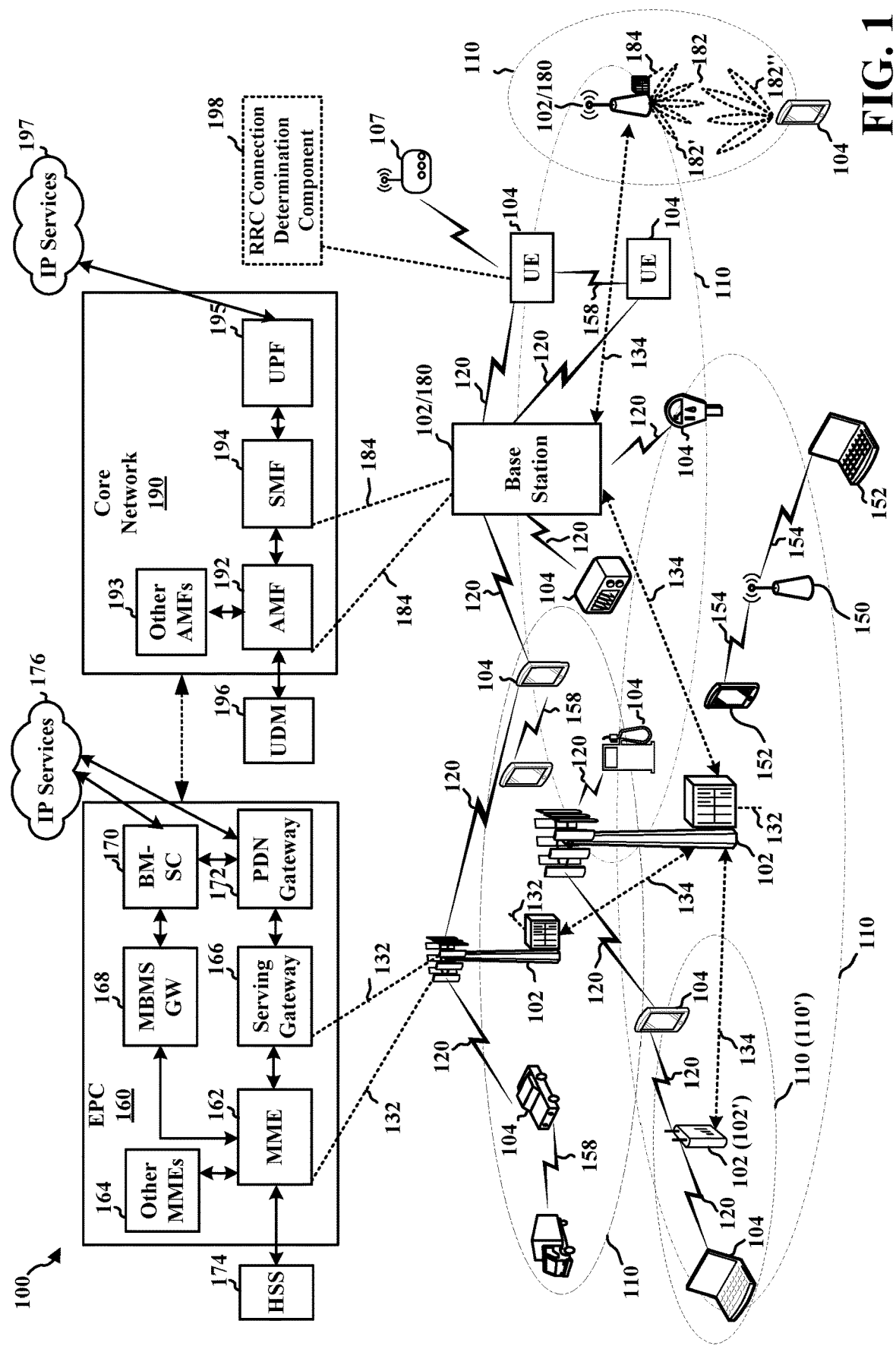
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a user equipment (UE) 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Figure 2:
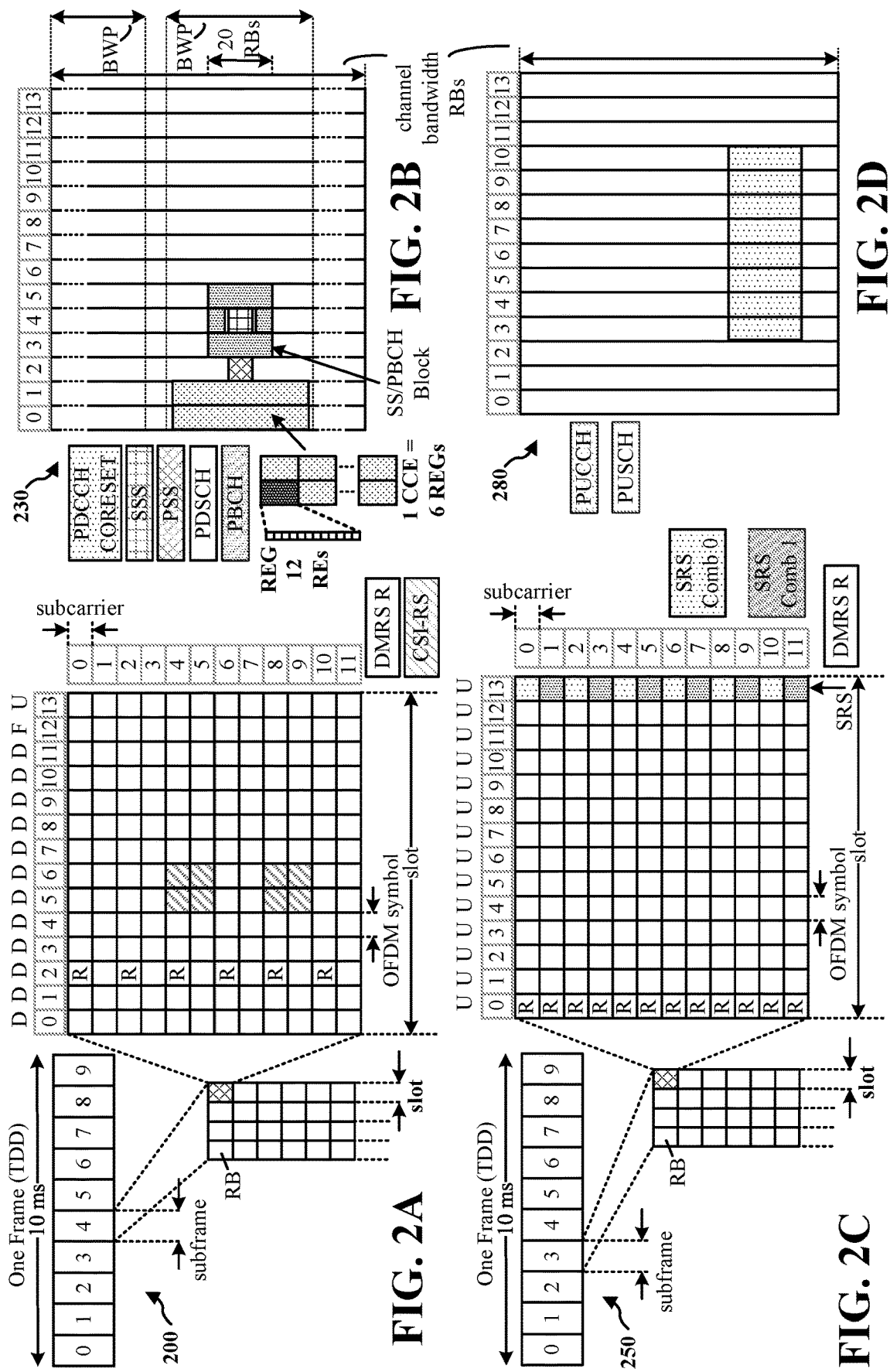
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a beam training component 198 configured to determine to perform beam training with a second UE in a set of beam training resources, the set of beam training resources including a first subset of beam training resources for UEs without a radio resource control (RRC) connection with a UE associated with the beam training and a second subset of beam training resources for UEs with an RRC connection with the UE associated with the beam training, the first subset of beam training resources and the second subset of beam training resources being non-overlapping; determine whether the first UE is RRC connected with the second UE; and perform beam training in one of the first subset of beam training resources or the second subset of beam training resources based on the determination whether the first UE is RRC connected with the second UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
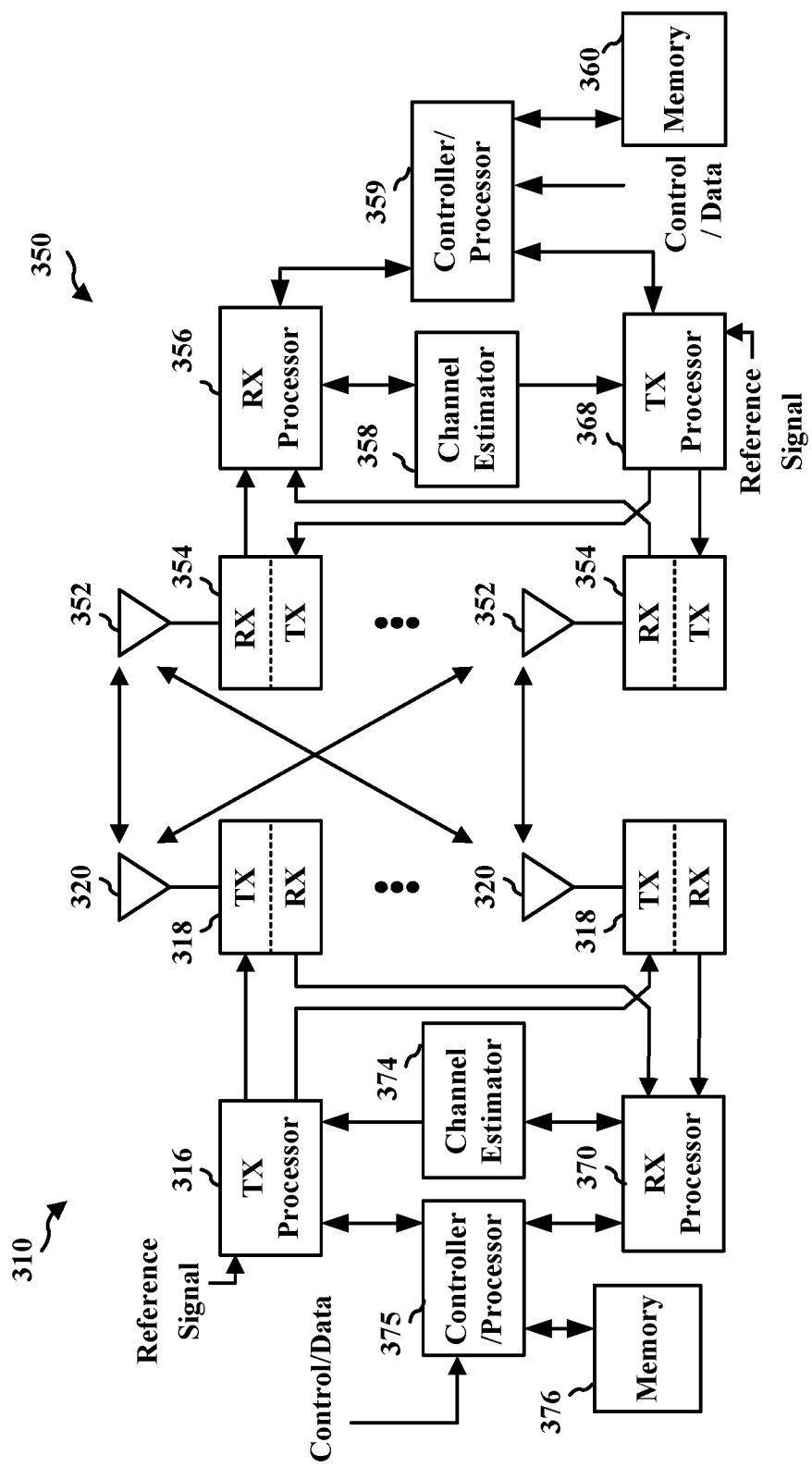
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a RRC layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam training component 198 of FIG. 1.

Figure 4:
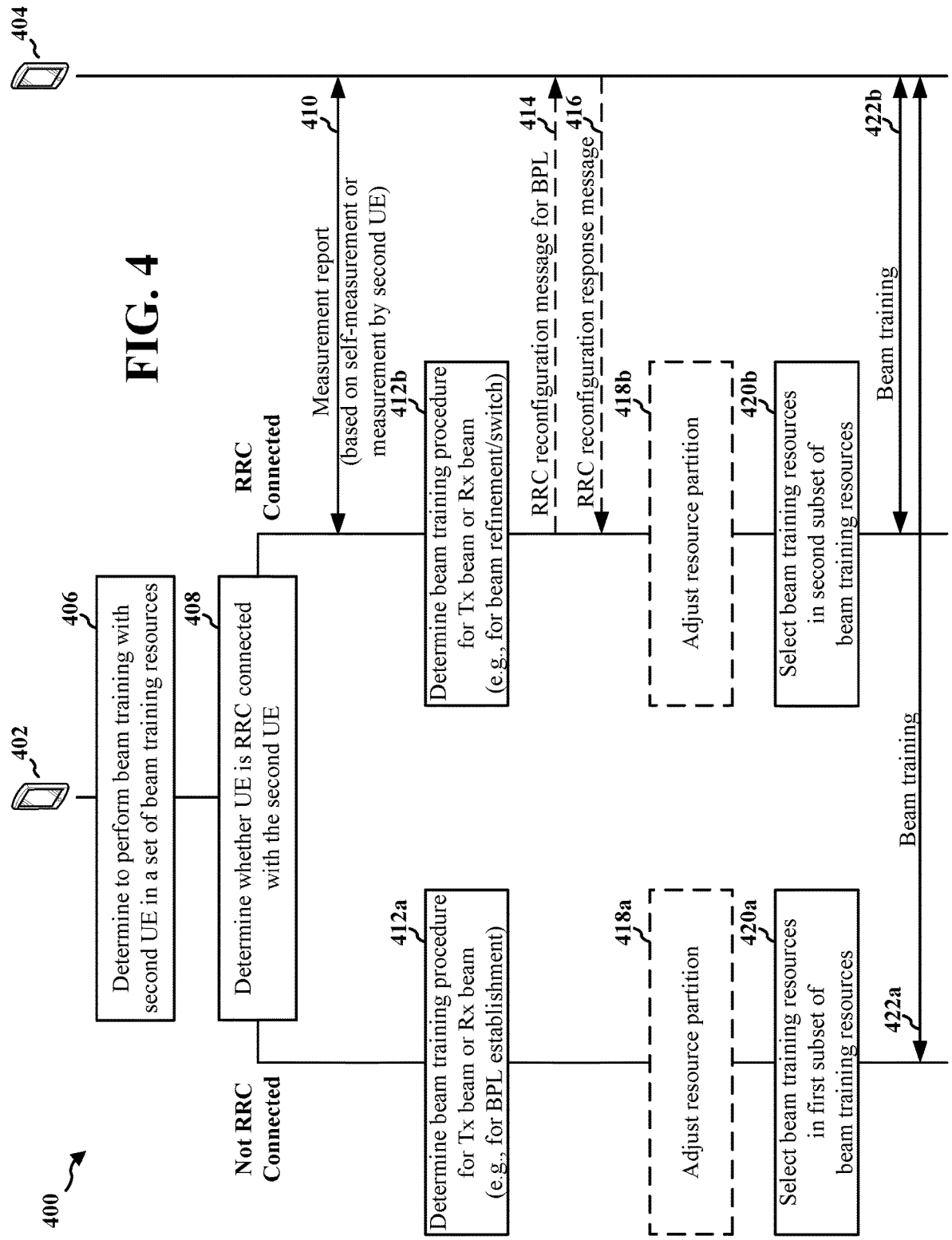
FIG. 4 is a call flow diagram illustrating communications between a first UE and a second UE.

FIG. 4 is a call flow diagram 400 illustrating communications between a first UE 402 and a second UE 404. The first UE 402 may perform a beam training procedure with the second UE 404 based on a set of resources partitioned in time and/or frequency. The partition may provide a first subset of resources to be used by UEs that are not RRC connected and a second subset of resources to be used by UEs that are RRC connected. Accordingly, the first UE 402 may determine, at 406, to perform a beam training procedure with the second UE 404 in the set of beam training resources partitioned in time and/or frequency. The beam training procedure may be for beam pair link (BPL) establishment with the second UE 404, beam refinement, beam switching, etc.

At 408, the first UE 402 may determine whether the first UE 402 is RRC connected with the second UE 404. If the first UE 402 is not RRC connected with the second UE 404, the first UE 402 may determine, at 412a, a beam training procedure for a Tx beam or a Rx beam of the first UE 402. A beam training procedure performed by the first UE 402 when the first UE 402 is not RRC connected with the second UE 404 may be based on the BPL establishment with the second UE 404. In configurations, the first UE 402 may be attempting to recover from a radio link failure (RLF).

The partition for the set of beam training resources may be initially determined by the first UE 402 based on a default configuration. However, if discovery procedures indicate that more resources should be included in either the first subset of resources or the second subset of resources, the first UE 402 may adjust, at 418a, the resource partition accordingly. That is, the first UE 402 may adjust, at 418a, the resource partition for the set of beam training resources to increase or decrease a size of the first subset of resources or the second subset of resources. At 420a, the first UE 402 may select beam training resources from the first subset of beam training resources when the first UE 402 is not RRC connected with the second UE 404 and perform, at 422a, the determined beam training procedure with the second UE 404 based on the selected resources from the first subset of beam training resources.

The first UE 402 may alternatively determine, at 408, that the first UE 402 is RRC connected with the second UE 404. A measurement report communicated, at 410, between the first UE 402 and the second UE 404 may trigger a particular type of beam training procedure. For example, a beam training procedure performed by the first UE 402 when the first UE 402 is RRC connected with the second UE 404 may be based on beam refinement or beam switching. Beam refinement may be performed by the first UE 402 when the BPL with the second UE 404 may be improved but may continue to be used, whereas beam searching may be performed by the first UE 402 when a beam is to be abandoned by the first UE 402 in favor of a different beam. The measurement report communicated, at 410, may be based on a self-measurement transmitted from the first UE 402 to the second UE 404 or a measurement performed by the second UE 404 and received by the first UE 402 from the second UE 404.

When the first UE 402 is not RRC connected with the second UE 404, the first UE 402 may determine, at 412b, the beam training procedure, such as the beam refinement procedure or the beam switching procedure, for a Tx beam or a Rx beam of the first UE 402. At 414, the first UE 402 may transmit, to the second UE 404, a RRC reconfiguration message for the BPL. The RRC reconfiguration message may be indicative of the determined beam training procedure, one or more transmission configuration indicator (TCI)-state-IDs indicating beams to be monitored (e.g., via a quasi co-location (QCL) assumption for a reference signal), and the second subset of resources. At 416, the first UE 402 may receive a RRC reconfiguration response message from the second UE 404 indicative of whether the second UE 404 accepts the RRC reconfiguration.

The partition for the set of beam training resources may be initially determined by the first UE 402 based on a default configuration, but may be adjusted by the first UE 402 based on an indication that more resources should be included in either the first subset of resources or the second subset of resources. That is, the first UE 402 may adjust, at 418b, the resource partition for the set of beam training resources to increase or decrease a size of the first subset of resources or the second subset of resources. At 420b, the first UE 402 may select beam training resources from the second subset of beam training resources when the first UE 402 is RRC connected with the second UE 404 and perform, at 422b, the determined beam training procedure with the second UE 404 based on the selected resources from the second subset of beam training resources.

Figure 5:
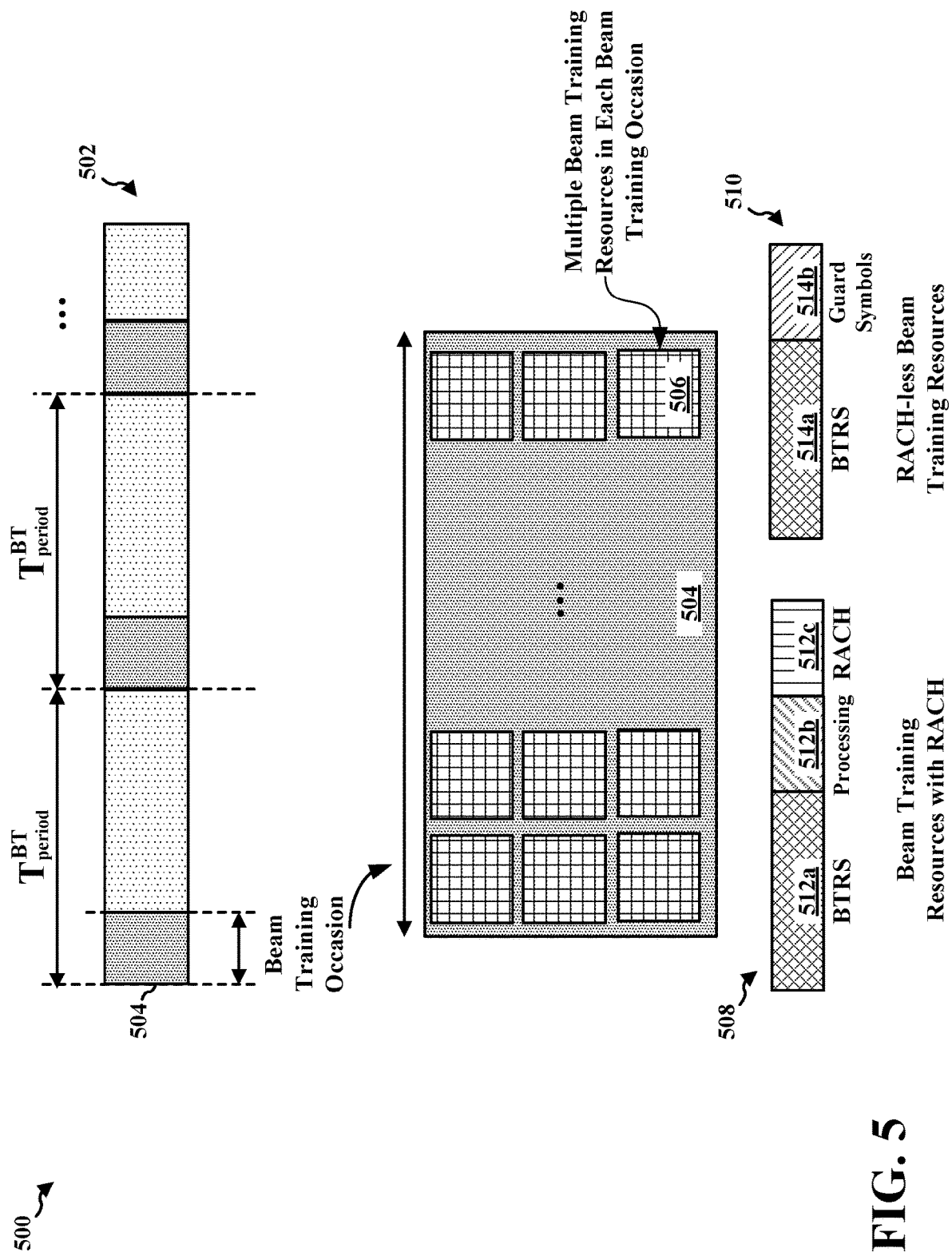
FIG. 5 is a diagram illustrating resources for performing a beam training procedure.

FIG. 5 is a diagram 500 illustrating resources for performing a beam training procedure. Millimeter wave (mmW) communications in frequency range 2 (FR2) may be based on frequencies from 24.25 GHz to 52.6 GHz. Communications transmitted in FR2 may be beamformed based on a path loss that may occur for such transmissions. That is, high-frequency waves associated with FR2 may degrade more rapidly with distance than lower frequency waves (e.g., frequency range 1 (FR1) waves corresponding to frequencies of 410 MHz to 7,125 MHz). Beamforming operations performed for sidelink communications, such as V2X, D2D, etc., may have increased complexity in comparison to beamforming operations performed between a base station and a UE, as each UE of a distributed network may have to establish a BPL with a peer UE to perform point-to-point (e.g., unicast) communications. In distributed networks, a central entity such as a base station, a RSU, an AP, etc., may not be used to coordinate sidelink communications. Thus, establishing and maintaining mmW links in distributed networks may correspond to a higher overhead than establishing and maintaining links in FR1 and/or establishing and maintaining mmW links where resources are scheduled by a central entity.

For sidelink communication over FR2 in distributed networks, network-wide/system-wide periodic beam training resources, such as beam training resources 506, may be semi-statically configured for beam search and beam training procedures. The beam training resources 506 of a beam training occasion 504 may have an increased time period for allowing a plurality of nodes in the distributed network to create and maintain links with each other. The increased time period for the beam training resources 506/beam training occasion 504 may provide reduced system overhead. For example, a 100 ms beam training occasion 504 may be configured every 1,000 ms to provide a 10 percent overhead. Each of the network-wide/system-wide periodic resources may be tens or hundreds of milliseconds for distributed nodes in the network to create and maintain links (e.g., based on beam searching, RACH procedures, etc.) in the semi-statically configured resources. Since such resources may be associated with the increased time period, the beam training resources 506 may occur less frequently than resources associated with a reduced time period. For instance, unlike Uu links where resources may be synchronized every 20 ms (e.g., based on 5 ms beam training resources), 100 ms beam training resources (e.g., 506) may cause a longer beam training occasion (e.g., 504) to be provided. In aspects, each beam training occasion 504 may include multiple beam training resources 506. The UE may select the beam training resources 506 for a beam training procedure 508/510 that reduces resource collisions with other UEs attempting to use the same beam training resources 506.

Semi-static beam training resources 506 of a beam training occasion 504 may occur periodically in a sidelink frame 502. That is, the network-wide/system-wide beam training occasions 504 may be periodically configured based on $T_{period}^{BT}$. Each beam training occasion 504 may include the multiple beam training resources 506. The beam training resources 506 may be multiplexed in time and/or frequency based on time division multiplexing (TDM) and/or frequency division multiplexing (FDM). The beam training resources 506 may be utilized for an initial BPL establishment based on a first beam training procedure 508 or for beam refinement/beam switching based on a second beam training procedure 510. In aspects, after the BPL is established based on the first beam training procedure 508, connected UEs may further have to maintain the BPL based on the second beam training procedure 510.

The beam training resources 506 may be of different types including beam training resources 506 associated with a RACH procedure 512c and beam training resources that are not associated with a RACH procedure (e.g., RACH-less beam training based on the second beam training procedure 510). The beam training resources 506 associated with the RACH procedure 512 may be further associated with a beam training reference signal (BTRS) 512a, which may be followed by a processing period 512b, which may be further followed by the RACH procedure 512c. The beam training resources 506 associated with RACH-less beam training may include a BTRS 514a, which may be followed by one or more guard symbols 514b. In aspects, the beam training resources 506 associated with the RACH procedure 512c may be used for establishing the BPL with the peer UE, whereas the beam training resources 506 associated with RACH-less beam training may be used when the UE has already discovered the peer UE and conducted the RACH procedure 512c with the peer UE, but is attempting to perform procedures such as beam refinement, beam switching, etc. The UEs may select the beam training resources 506 for performing the beam training procedures 508-510 in a manner that decreases collisions among the beam training resources 506.

Management of the BPL may be based on whether the UE is a standalone device or a non-standalone device. Standalone devices may be configured to operate in FR2, whereas non-standalone devices may be configured to operate in FR2 as well as other frequency ranges (e.g., sub-6 GHz frequency ranges, LTE frequency ranges, etc.). BPL establishment in standalone configurations may be based on transmitting the BTRS 512*a* via the network-wide/system-wide beam training resources 506. A peer UE may be configured to listen for the BTRS 512*a* and transmit a RACH on a predetermined RACH occasion. Beam training resources 506, access times, RACH occasions, etc., may occur based on a default configuration, such that a RRC connection may be established following a device discovery procedure. For example, after the beam training occasion 504, a discovery message may be transmitted based on the beam training procedure 508/510. For BPL establishment in non-standalone configurations, device discovery and a RRC connection may have already occurred (e.g., over FR1) for performing RACH-less beam training/scanning in FR2 and a beam report may be transmitted over the existing RRC connection.

Beam refinement and beam switching procedures for FR2 may be based on the UE being RRC connected with a peer UE. Thus, RACH-less beam training for FR2 may be followed by a RRC indication of a dominant beam direction. Thus, the beam training resources 506 associated with the RACH procedure 512*c* may be used for standalone configurations and the beam training resources 506 associated with RACH-less beam training may be used for non-standalone configurations including beam refinement/beam switching procedures.

Sidelink transmissions over FR2 may be based on the network-wide/system-wide beam training resources 506. The resources may be semi-statically configured for beam training occasions 504, such that each beam training occasion 504 may include multiple beam training resources 506 for beam training, beam alignment, beam refinement, BPL establishment, etc. In aspects, a selection of same beam training resources by the peer UE may result in degraded measurements via interference that causes beam misalignment or discovery failure. Thus, UE sidelink performance may be increased (e.g., in FR2) based on configuring the UE to select beam training resources 506 from a beam training resource pool of the beam training occasion 504. For example, a partition of the beam training resource pool may separate a first subset of beam training resources for initial BPL establishment by standalone UEs from a second subset of beam training resources for BPL establishment and beam refinement/beam searching by UEs with existing RRC connections. The UE may select the beam training resources 506 from the resource pool based on the partition. The UE may also determine subsequent partition locations based on network conditions. For example, if discovery procedures indicate that more nearby UEs are non-standalone UEs, the partition may be adjusted to provide more beam training resources 506 for the non-standalone UEs. In other examples, the partition may be adjusted in an opposite direction when the discovery procedures indicate that more nearby UEs are standalone UEs. In further examples, the partition may be eliminated altogether based on all the nearby UEs being either standalone UEs or non-standalone UEs.

Figure 6:
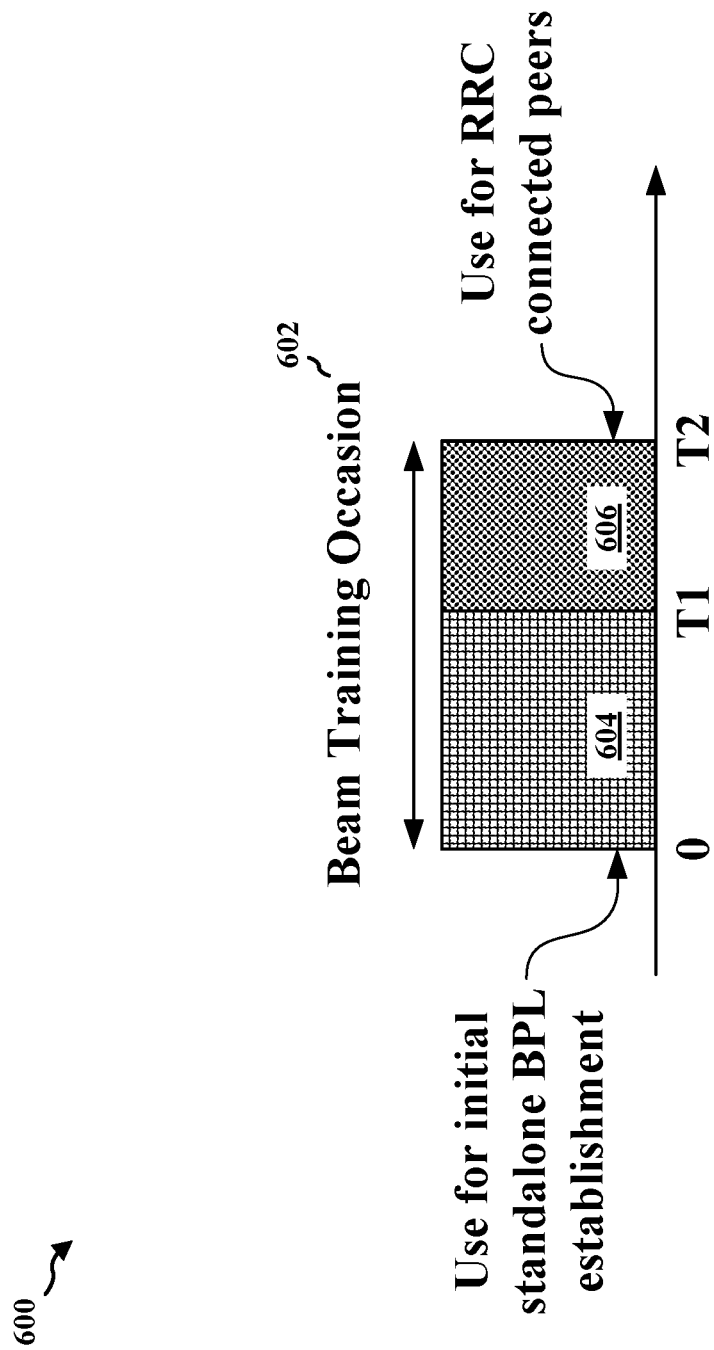
FIG. 6 illustrates a diagram of a beam training occasion partitioned into a first subset of beam training resources for non-RRC connected UEs and a second subset of beam training resources for RRC connected UEs.

FIG. 6 illustrates a diagram 600 of a beam training occasion 602 partitioned into a first subset of beam training resources 604 for non-RRC connected UEs and a second subset of beam training resources 606 for RRC connected UEs. The network-wide/system-wide beam training resources 604-606 may initially be determined based on a default configuration. For example, a UE may determine that the beam training occasion 602 may be divided into a predefined number of beam training resources including the first subset of beam training resources 604 and the second subset of beam training resources 606. The subsets of beam training resources 604-606 may be used for the RACH-less beam training or the beam training associated with the RACH procedure. Further, each beam training resource of the subsets of beam training resources 604-606 may be of time duration $t_0$, which may be a predefined time duration indicative of a number of beams that may be scanned by the UE. Based on a length of the beam training occasion 602 and determining a number of symbols for performing an individual scan, the UE may determine a maximum number of beams that may be scanned during the beam training occasion 602. A scan may be based on one automatic gain control (AGC) symbol followed by one or more pre-configured BTRS symbols. The beam training associated with the RACH procedure may be further based on determining a number of RACH occasions via a predefined mapping between the BTRS and the RACH occasions.

The beam training occasion 602 may be partitioned from $[0, T_1]$ to provide the first subset of beam training resources 604 and from $[T_1, T_2]$ to provide the second subset of beam training resources 606. In configurations where the UE is a standalone device that does not have an existing RRC connection with a peer UE, the standalone UE may determine that the first subset of beam training resources 604 extends from $[0, T_1]$ based on a default configuration and may select one or more beam training resource during the time period from $[0, T_1]$. To establish a BPL in a standalone mode or recover from a RLF, the UE may enumerate the first subset of beam training resources 604 partitioned from $[0, T_1]$ in a predetermined order. Based on the number of beams to be scanned, the UE may select one or more beam training resources from the first subset of beam training resources 604 that correspond to $[0, T_1]$. Additionally or alternatively, the UE may select M beam training resources in a uniformly random manner from a set of N total resources, where M corresponds to a number of resources used to scan a determined number of beams. In further aspects, the UE may select the M resources based on an identity (ID) of the UE (e.g., a layer 2 ID) via a predefine d protocol.

The first subset of beam training resources 604 partitioned from $[0, T_1]$ may be used in standalone configurations for initial BPL establishment (e.g., RACH occasions) and the second subset of beam training resources 606 partitioned from $[T_1, T_2]$ may be used for RRC connected UEs (e.g., RACH-less occasions). The resources of the beam training occasion 602 may be split in time so that a non-standalone UE that determines to listen for transmissions of a standalone UE may perform beam training on different resources from the standalone UE. Thus, the non-standalone UE may refrain from transmitting at times that correspond to the time period $[0, T_1]$, unless the non-standalone UE includes enhanced capabilities (e.g., multiple panels for transmitting and receiving signals).

In some cases, the UE may have an existing RRC connection with a peer UE. For example, a non-standalone UE may have established a RRC connection over FR1 or a standalone UE may have established a RRC connection over FR2 based on an already-established BPL, where the standalone UE may intend to perform beam refinement, beam alignment/realignment, etc. The UE may perform a self-measurement or receive a measurement report that triggers the beam training procedure. A UE that determines to transmit a BTRS may perform a Rx beam sweep/alignment based on transmitting a RRC reconfiguration message to a peer UE via sidelink during the time period $[0, T_1]$. The RRC reconfiguration message may be indicative of a beam training procedure, a set of TCI-state-IDs indicating beams to be monitored (e.g., via a QCL assumption for a reference signal), and M resources selected from the time period [$T_1$, $T_2$] of the beam training occasion 602. In further aspects, the RRC reconfiguration message may be indicative of the beam training procedure, one TCI-state-ID indicating a transmission beam to be trained, and M resources selected from the time period [$T_1$, $T_2$] of the beam training occasion 602. Upon receiving the RRC reconfiguration message, the peer UE may accept the RRC reconfiguration message based on a RRC reconfiguration response message transmitted to the UE via sidelink. The peer UE may also be configured to update the resources indicated in the RRC reconfiguration message for the beam training procedure based on internal sensing techniques. The UE and the peer UE may communicate back and forth (e.g., negotiate beam training resources) until a proposed set of beam training resources is accepted for the time period [$T_1$, $T_2$] for performing the beam training procedure.

Based on a message load of the network and a presence/number of standalone and non-standalone devices, the UE may adjust an initial determination of the beam training resource partition (e.g., determined via the default configuration). The UE may listen over the beam training occasion 602 when the UE is not transmitting a BTRS (e.g., the UE may initiate a discovery/search operation while the UE is idle). The UE may determine that the subset of resources (e.g., 604 or 606) opposite of the resources partition for the UE (e.g., 606 or 604) includes a fraction of resources, higher than a predefined fraction a, that is unused over n successive beam training occasions 602 or that certain time-frequency resource of the subset of resources opposite of the partition for the UE were available for k successive beam training occasions 602, where the parameters n and k may be default parameters. In such cases, the UE may determine that the resources are to be removed from the subset of resources opposite of the partition and added to the subset of resources on the side of the partition associated with the UE, where the UE may use such resources for performing the beam training procedure.

In an example, a RRC connected UE may determine that a fraction of resources in the first subset of beam training resources 604 partition for non-RRC connected UEs has been unused for n consecutive beam training occasions 602. The UE may determine to remove the unused resources from the first subset of beam training resources 604 and add the unused resources to the second subset of beam training resources 606. The determination of whether the beam training resources are used or unused may be based on a measured RSRP over the beam training resources and/or a direction from which transmissions on the beam training resources are received. Thus, beam refinement/beam alignment may be performed in orthogonal/non-interfering directions.

Figure 7:
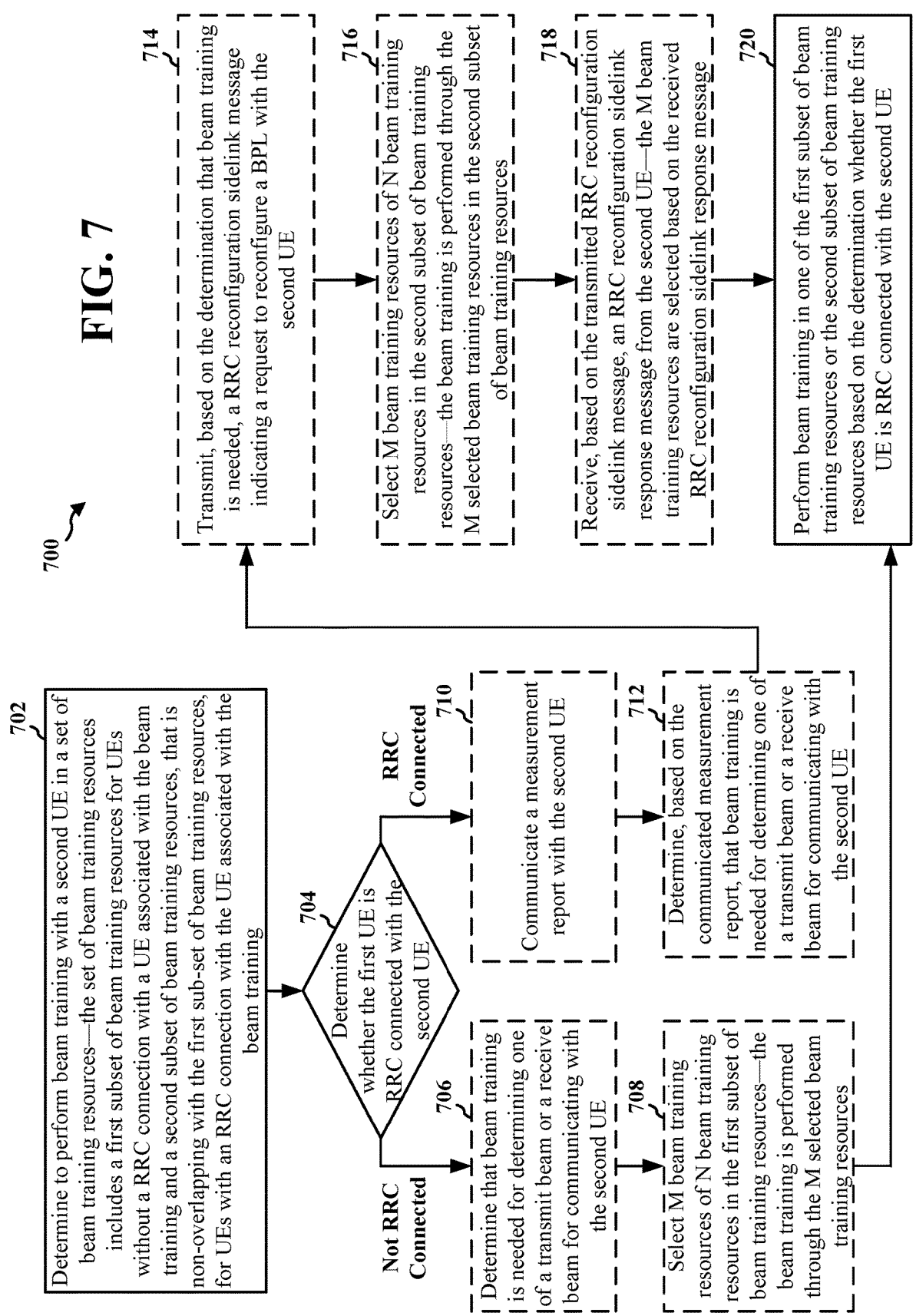
FIG. 7 is a flowchart of a method of wireless communication of a UE.

FIG. 7 is a flowchart 700 of a method of wireless communication. The method may be performed by a UE (e.g., the UE 104/402; the apparatus 802; etc.), which may include the memory 360 and which may be the entire UE 104/402 or a component of the UE 104/402, such as the TX processor 368, the RX processor 356, and/or the controller/processor 359.

At 702, the UE may determine to perform beam training with a second UE in a set of beam training resources—the set of beam training resources includes a first subset of beam training resources for UEs without a RRC connection with a UE associated with the beam training and a second subset of beam training resources, that is non-overlapping with the first sub-set of beam training resources, for UEs with an RRC connection with the UE associated with the beam training. For example, referring to FIGS. 4 and 6, the first UE 402 may determine, at 406, to perform beam training with the second UE 404 in a set of beam training resources including a first subset of beam training resources 604 used for initial standalone BPL establishment and a second subset of beam training resources 606 used for RRC connected UEs. The first subset of beam training resources 604 may be non-overlapping with the second subset of beam training resources 606 in the beam training occasion 602. The first subset of beam training resources 604 and the second subset of beam training resources 606 may be one of TDMed or FDMed. In aspects, the set of beam training resources may be based on a partition between the first subset of beam training resources 604 and the second subset of beam training resources 606, where the partition may be adjusted based on a determined RSRP on each of the first subset of beam training resources 604 and the second subset of beam training resources 606.

At 704, the UE may determine whether the first UE is RRC connected with the second UE. For example, referring to FIG. 4, the first UE 402 may determine, at 408, whether the first UE 402 is RRC connected with the second UE 404.

At 706, the UE may determine, when the first UE is determined not to be RRC connected with the second UE, that beam training is needed for determining one of a transmit beam or a receive beam for communicating with the second UE. For example, referring to FIG. 4, the first UE 402 may determine, at 412a, a beam training procedure for a Tx beam or a Rx beam of the first UE 402 when the first UE 402 is not RRC connected with the second UE 404. In aspects, the beam training procedure may be for BPL establishment with the second UE 404.

At 708, where the first subset of beam training resources includes N beam training resources, the UE may select M beam training resources of the N beam training resources in the first subset of beam training resources—the beam training is performed through the M selected beam training resources. For example, referring to FIGS. 4-6, the first UE 402 may select, at 420a, beam training resources in the first subset of beam training resources (e.g., the first subset of beam training resources 604) to perform, at 422a, the beam training procedure with the second UE 404. A beam training procedure, such as the beam training procedure 510, may be based on selecting a subset of the beam training resources 506 included in a beam training occasion 504. The M beam training resources may be selected at least one of uniformly randomly from the N beam training resources or based on an identifier of the first UE 402.

At 710, the UE may communicate, when the first UE is determined to be RRC connected with the second UE, a measurement report with the second UE. For example, referring to FIG. 4, a measurement report may be communicated, at 410, between the first UE 402 and the second UE 404 when the first UE 402 is RRC connected with the second UE 404.

At 712, the UE may determine, based on the communicated measurement report, that beam training is needed for determining one of a transmit beam or a receive beam for communicating with the second UE. For example, referring to FIG. 4, the first UE 402 may determine, at 412b, a beam training procedure for a Tx beam or a Rx beam of the first UE 402 based on the measurement report communicated, at 410. In aspects, the beam training procedure may be for a beam refinement procedure or a beam switching procedure of the first UE 402.

At 714, the UE may transmit, based on the determination that beam training is needed, a RRC reconfiguration sidelink message indicating a request to reconfigure a BPL with the second UE. For example, referring to FIG. 4, the first UE 402 may transmit, at 414, a RRC reconfiguration message for the BPL with the second UE 404 based on the determination, at 412b, of the beam training procedure. The transmitted RRC reconfiguration sidelink message (e.g., transmitted at 414) may indicate at least one TCI state indicating a QCL assumption for a reference signal associated with at least one transmit beam for performing the beam training, the beam training performed based on the transmitted at least one TCI state ID.

At 716, where the second subset of beam training resources includes N beam training resources, the UE may select M beam training resources of N beam training resources in the second subset of beam training resources—the beam training is performed through the M selected beam training resources in the second subset of beam training resources. For example, referring to FIGS. 4-6, the first UE 402 may select, at 420b, beam training resources in the second subset of beam training resources (e.g., the second subset of beam training resources 606) to perform, at 422b, the beam training procedure with the second UE 404. A beam training procedure, such as the beam training procedure 508, may be based on selecting a subset of the beam training resources 506 included in the beam training occasion 504.

At 718, the UE may receive, based on the transmitted RRC reconfiguration sidelink message, an RRC reconfiguration sidelink response message from the second UE—the M beam training resources are selected based on the received RRC reconfiguration sidelink response message. For example, referring to FIGS. 4 and 6, the first UE 402 may receive, at 416, a RRC reconfiguration response message from the second UE 404 based on the RRC reconfiguration message transmitted, at 414, for the BPL. The first UE 402 may select, at 420b, the beam training resources in the second subset of beam training resources (e.g., the second subset of beam training resources 606) based on the RRC reconfiguration response message received, at 416, from the second UE 404.

At 720, the UE may perform beam training in one of the first subset of beam training resources or the second subset of beam training resources based on the determination whether the first UE is RRC connected with the second UE. For example, referring to FIGS. 4 and 6, the first UE 402 may perform, at 422a, the beam training procedure in the first subset of beam training resources 604 or the first UE 402 may perform, at 422b, the beam training procedure in the second subset of beam training resources 606 based on the determination, at 408, of whether the first UE 402 is RRC connected with the second UE 404.

Figure 8:
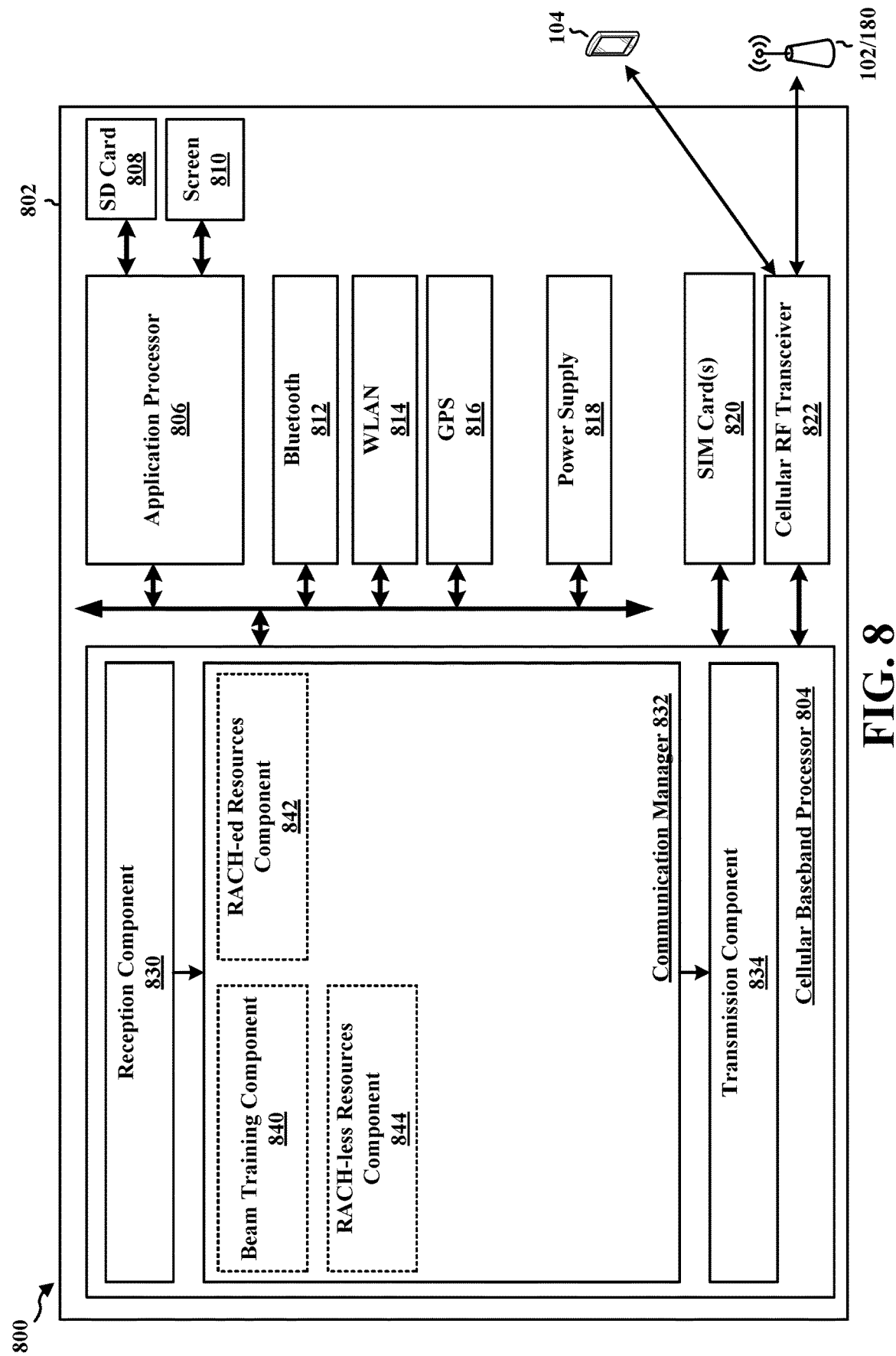
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a beam training component 840 that is configured, e.g., as described in connection with 702, 704, and 720, to determine to perform beam training with a second UE in a set of beam training resources—the set of beam training resources includes a first subset of beam training resources for UEs without a RRC connection with a UE associated with the beam training and a second subset of beam training resources, that is non-overlapping with the first sub-set of beam training resources, for UEs with an RRC connection with the UE associated with the beam training; to determine whether the first UE is RRC connected with the second UE; and to perform beam training in one of the first subset of beam training resources or the second subset of beam training resources based on the determination whether the first UE is RRC connected with the second UE.

The communication manager 832 further includes a RACH-ed resources component 842 that is configured, e.g., as described in connection with 710, 712, 714, 716, and 718, to communicate a measurement report with the second UE; to determine, based on the communicated measurement report, that beam training is needed for determining one of a transmit beam or a receive beam for communicating with the second UE; to transmit, based on the determination that beam training is needed, a RRC reconfiguration sidelink message indicating a request to reconfigure a BPL with the second UE; to select M beam training resources of N beam training resources in the second subset of beam training resources the beam training is performed through the M selected beam training resources in the second subset of beam training resources; and to receive, based on the transmitted RRC reconfiguration sidelink message, an RRC reconfiguration sidelink response message from the second UE—the M beam training resources are selected based on the received RRC reconfiguration sidelink response message. The communication manager 832 further includes a RACH-less resources component 844 that is configured, e.g., as described in connection with 706 and 708, to determine that beam training is needed for determining one of a transmit beam or a receive beam for communicating with the second UE; and to select M beam training resources of N beam training resources in the first subset of beam training resources—the beam training is performed through the M selected beam training resources.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for means for determining to perform beam training with a second UE in a set of beam training resources, the set of beam training resources including a first subset of beam training resources for UEs without a RRC connection with a UE associated with the beam training and a second subset of beam training resources for UEs with an RRC connection with the UE associated with the beam training, the first subset of beam training resources and the second subset of beam training resources being non-overlapping; means for determining whether the first UE is RRC connected with the second UE; and means for performing beam training in one of the first subset of beam training resources or the second subset of beam training resources based on the determination whether the first UE is RRC connected with the second UE. When the first UE is determined not to be RRC connected with the second UE and the first subset of beam training resources include s N beam training resources, the apparatus 802 may further include means for determining that beam training is needed for determining one of a transmit beam or a receive beam for communicating with the second UE; and means for selecting M beam training resources of the N beam training resources in the first subset of beam training resources, the beam training being performed through the M selected beam training resources.

When the first UE is determined to be RRC connected with the second UE, the apparatus 802 may further include means for communicating a measurement report with the second UE; and means for determining, based on the communicated measurement report, that beam training is needed for determining one of a transmit beam or a receive beam for communicating with the second UE. When the second subset of beam training resources includes N beam training resources, the apparatus 802 may further include means for transmitting, based on the determination that beam training is needed, a RRC reconfiguration sidelink message indicating a request to reconfigure a BPL with the second UE; and means for selecting M beam training resources of the N beam training resources in the second subset of beam training resources, the beam training being performed through the M selected beam training resources in the second subset of beam training resources. The apparatus 802 may further include means for receiving, based on the transmitted RRC reconfiguration sidelink message, an RRC reconfiguration sidelink response message from the second UE, wherein the M beam training resources are selected based on the received RRC reconfiguration sidelink response message. The apparatus 802 may further include means for adjusting a partition for the first subset of beam training resources and a second subset of beam training resources based on a corresponding determined RSRP on each of the first subset of beam training resources and the second subset of beam training resources.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, when the UE determines to perform a beam training procedure with another UE, the UE may select beam training resources from a set of beam training resources during a network-wide/system-wide beam training occasion. The set of beam training resources may be partitioned into a first subset of beam training resources and a second subset of beam training resources. The first subset of beam training resources may be used to perform beam training procedures that occur prior to the RACH procedure. For example, the first subset of beam training resources may be used for an initial BPL establishment. The second subset of beam training resources may be used for performing beam training procedures that occur after the RACH procedure. For example, the second subset of beam training resources may be used for beam refinement or beam switching. Based on whether the UE has performed the RACH procedure, the UE may select beam training resources from either the first subset of beam training resources or the second subset of beam training resources to perform a determined beam training procedure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE, comprising: determining to perform beam training with a second UE in a set of beam training resources, the set of beam training resources including a first subset of beam training resources for UEs without a RRC connection with a UE associated with the beam training and a second subset of beam training resources for UEs with an RRC connection with the UE associated with the beam training, the first subset of beam training resources and the second subset of beam training resources being non-overlapping; determining whether the first UE is RRC connected with the second UE; and performing beam training in one of the first subset of beam training resources or the second subset of beam training resources based on the determination whether the first UE is RRC connected with the second UE.

Aspect 2 may be combined with aspect 1 and includes that the first UE is determined not to be RRC connected with the second UE, and the first subset of beam training resources includes N beam training resources, the aspect further comprising: determining that beam training is needed for determining one of a transmit beam or a receive beam for communicating with the second UE; and selecting M beam training resources of the N beam training resources in the first subset of beam training resources, the beam training being performed through the M selected beam training resources.

Aspect 3 may be combined with any of aspects 1-2 and includes that the M beam training resources are selected at least one of uniformly randomly from the N beam training resources or based on an identifier of the first UE.

Aspect 4 may be combined with aspect 1 and includes that the first UE is determined to be RRC connected with the second UE, the aspect further comprising: communicating a measurement report with the second UE; and determining, based on the communicated measurement report, that beam training is needed for determining one of a transmit beam or a receive beam for communicating with the second UE.

Aspect 5 may be combined with any of aspects 1 or 4 and includes that the second subset of beam training resources includes N beam training resources, the aspect further comprising: transmitting, based on the determination that beam training is needed, a RRC reconfiguration sidelink message indicating a request to reconfigure a BPL with the second UE; and selecting M beam training resources of the N beam training resources in the second subset of beam training resources, the beam training being performed through the M selected beam training resources in the second subset of beam training resources.

Aspect 6 may be combined with any of aspects 1 or 4-5 and includes that the transmitted RRC reconfiguration sidelink message indicates at least one TCI state ID indicating a QCL assumption for a reference signal associated with at least one transmit beam for performing the beam training, and the beam training is performed based on the transmitted at least one TCI state ID.

Aspect 7 may be combined with any of aspects 1 or 4-6 and further comprises receiving, based on the transmitted RRC reconfiguration sidelink message, an RRC reconfiguration sidelink response message from the second UE, wherein the M beam training resources are selected based on the received RRC reconfiguration sidelink response message.

Aspect 8 may be combined with any of aspects 1-7 and includes that the first subset of beam training resources and the second subset of beam training resources are one of time division multiplexed or frequency division multiplexed.

Aspect 9 may be combined with any of aspects 1-8 and further comprises adjusting a partition for the first subset of beam training resources and a second subset of beam training resources based on a corresponding determined RSRP on each of the first subset of beam training resources and the second subset of beam training resources.

Aspect 10 is an apparatus for wireless communication including at least one processor coupled to a memory and configured to implement a method as in any of aspects 1-9.

Aspect 11 is an apparatus for wireless communication including means for implementing a method as in any of aspects 1-9.

Aspect 12 is a computer-readable medium storing computer executable code, the code when executed by at least one processor causes the at least one processor to implement a method as in any of aspects 1-9.

What is claimed is:

1. A method of wireless communication of a first user equipment (UE), comprising:
   determining to perform beam training with a second UE in a set of beam training resources that is semi-statically configured as part of a beam training occasion, the set of beam training resources including a first subset of beam training resources for UEs without a radio resource control (RRC) connection with a UE associated with the beam training and a second subset of beam training resources for UEs with an RRC connection with the UE associated with the beam training, the first subset of beam training resources and the second subset of beam training resources being non-overlapping;
   determining whether the first UE is RRC connected with the second UE; and
   performing beam training in the first subset of beam training resources based on a determination that the first UE is not RRC connected with the second UE or in the second subset of beam training resources based on a determination that the first UE is RRC connected with the second UE.

2. The method of claim 1, wherein the first UE is determined not to be RRC connected with the second UE, and the first subset of beam training resources includes N beam training resources, the method further comprising:
   determining that beam training is to be used for determining one of a transmit beam or a receive beam for communicating with the second UE; and selecting M beam training resources of the N beam training resources in the first subset of beam training resources, the beam training being performed through the M selected beam training resources.

3. The method of claim 2, wherein the M beam training resources are selected at least one of uniformly randomly from the N beam training resources or based on an identifier of the first UE.

4. The method of claim 1, wherein the first UE is determined to be RRC connected with the second UE, the method further comprising:
communicating a measurement report with the second UE; and
determining, based on the communicated measurement report, that beam training is to be used for determining one of a transmit beam or a receive beam for communicating with the second UE.

5. The method of claim 4, wherein the second subset of beam training resources includes N beam training resources, the method further comprising:
transmitting, based on the determination that beam training is to be used, a radio resource control (RRC) reconfiguration sidelink message indicating a request to reconfigure a beam pair link (BPL) with the second UE; and
selecting M beam training resources of the N beam training resources in the second subset of beam training resources, the beam training being performed through the M selected beam training resources in the second subset of beam training resources.

6. The method of claim 5, wherein the transmitted RRC reconfiguration sidelink message indicates at least one transmission configuration indictor (TCI) state identity (ID) indicating a quasi co-location (QCL) assumption for a reference signal associated with at least one transmit beam for performing the beam training, and the beam training is performed based on the transmitted at least one TCI state ID.

7. The method of claim 5, further comprising receiving, based on the transmitted RRC reconfiguration sidelink message, an RRC reconfiguration sidelink response message from the second UE, wherein the M beam training resources are selected based on the received RRC reconfiguration sidelink response message.

8. The method of claim 1, wherein the first subset of beam training resources and the second subset of beam training resources are one of time division multiplexed or frequency division multiplexed.

9. The method of claim 1, further comprising adjusting a partition for the first subset of beam training resources and a second subset of beam training resources based on a corresponding determined reference signal received power (RSRP) on each of the first subset of beam training resources and the second subset of beam training resources such that a first size of the first subset of beam training resources is increased and a second size of the second subset of beam training resources is decreased or such that the first size of the first subset of beam training resources is decreased and the second size of the second subset of beam training resources is increased.

10. An apparatus for wireless communication of a first user equipment (UE), comprising:
a memory; and
at least one processor coupled to the memory and configured to:
determine to perform beam training with a second UE in a set of beam training resources that is semi-statically configured as part of a beam training occasion, the set of beam training resources including a first subset of beam training resources for UEs without a radio resource control (RRC) connection with a UE associated with the beam training and a second subset of beam training resources for UEs with an RRC connection with the UE associated with the beam training, the first subset of beam training resources and the second subset of beam training resources being non-overlapping;
determine whether the first UE is RRC connected with the second UE; and
perform beam training in the first subset of beam training resources based on a determination that the first UE is not RRC connected with the second UE or in the second subset of beam training resources based on a determination that the first UE is RRC connected with the second UE.

11. The apparatus of claim 10, wherein the at least one processor is configured to determine that the first UE is not RRC connected with the second UE, and the first subset of beam training resources includes N beam training resources, the at least one processor further configured to:
determine that beam training is to be used to determine one of a transmit beam or a receive beam for communications with the second UE; and
select M beam training resources of the N beam training resources in the first subset of beam training resources, wherein to perform the beam training, the at least one processor is configured to perform the beam training through the M selected beam training resources.

12. The apparatus of claim 11, wherein to select the M beam training resources, the at least one processor is configured to select the M beam training resources based on at least one of uniformly randomly from the N beam training resources or an identifier of the first UE.

13. The apparatus of claim 10, wherein the at least one processor is configured to determine that the first UE is RRC connected with the second UE, the at least one processor further configured to:
communicate a measurement report with the second UE; and
determine, based on the communicated measurement report, that beam training is to be used to determine one of a transmit beam or a receive beam for communications with the second UE.

14. The apparatus of claim 13, wherein the second subset of beam training resources includes N beam training resources, the at least one processor further configured to:
transmit, based on the determination that beam training is to be used, a radio resource control (RRC) reconfiguration sidelink message indicating a request to reconfigure a beam pair link (BPL) with the second UE; and
select M beam training resources of the N beam training resources in the second subset of beam training resources, wherein to perform the beam training, the at least one processor is configured to perform the beam training through the M selected beam training resources in the second subset of beam training resources.

15. The apparatus of claim 14, wherein the transmitted RRC reconfiguration sidelink message indicates at least one transmission configuration indictor (TCI) state identity (ID) indicating a quasi co-location (QCL) assumption for a reference signal associated with at least one transmit beam for used to perform the beam training, and wherein to perform the beam training, the at least one processor is configured to perform the beam training based on the transmitted at least one TCI state ID.

16. The apparatus of claim 14, wherein the at least one processor is further configured to receive, based on the transmitted RRC reconfiguration sidelink message, an RRC reconfiguration sidelink response message from the second UE, wherein to select the M beam training resources, the at least one processor is configured to select the M beam training resources based on the received RRC reconfiguration sidelink response message.

17. The apparatus of claim 10, wherein the first subset of beam training resources and the second subset of beam training resources are one of time division multiplexed or frequency division multiplexed.

18. The apparatus of claim 10, wherein the at least one processor is further configured to adjust a partition for the first subset of beam training resources and a second subset of beam training resources based on a corresponding determined reference signal received power (RSRP) on each of the first subset of beam training resources and the second subset of beam training resources such that a first size of the first subset of beam training resources is increased and a second size of the second subset of beam training resources is decreased or such that the first size of the first subset of beam training resources is decreased and the second size of the second subset of beam training resources is increased.

19. An apparatus for wireless communication of a first user equipment (UE), comprising:
   means for determining to perform beam training with a second UE in a set of beam training resources that is semi-statically configured as part of a beam training occasion, the set of beam training resources including a first subset of beam training resources for UEs without a radio resource control (RRC) connection with a UE associated with the beam training and a second subset of beam training resources for UEs with an RRC connection with the UE associated with the beam training, the first subset of beam training resources and the second subset of beam training resources being non-overlapping;
   means for determining whether the first UE is RRC connected with the second UE; and
   means for performing beam training in the first subset of beam training resources based on a determination that the first UE is not RRC connected with the second UE or in the second subset of beam training resources based on a determination that the first UE is RRC connected with the second UE.

20. The apparatus of claim 19, wherein the first UE is determined not to be RRC connected with the second UE, and the first subset of beam training resources includes N beam training resources, the apparatus further comprising:
   means for determining that beam training is to be used for determining one of a transmit beam or a receive beam for communicating with the second UE; and
   means for selecting M beam training resources of the N beam training resources in the first subset of beam training resources, the beam training being performed through the M selected beam training resources.

21. The apparatus of claim 20, wherein the M beam training resources are selected at least one of uniformly randomly from the N beam training resources or based on an identifier of the first UE.

22. The apparatus of claim 19, wherein the first UE is determined to be RRC connected with the second UE, the apparatus further comprising:
   means for communicating a measurement report with the second UE; and
   means for determining, based on the communicated measurement report, that beam training is to be used for determining one of a transmit beam or a receive beam for communicating with the second UE.

23. The apparatus of claim 22, wherein the second subset of beam training resources includes N beam training resources, the apparatus further comprising:
   means for transmitting, based on the determination that beam training is to be used, a radio resource control (RRC) reconfiguration sidelink message indicating a request to reconfigure a beam pair link (BPL) with the second UE; and
   means for selecting M beam training resources of the N beam training resources in the second subset of beam training resources, the beam training being performed through the M selected beam training resources in the second subset of beam training resources.

24. The apparatus of claim 23, wherein the transmitted RRC reconfiguration sidelink message indicates at least one transmission configuration indictor (TCI) state identity (ID) indicating a quasi co-location (QCL) assumption for a reference signal associated with at least one transmit beam for performing the beam training, and the beam training is performed based on the transmitted at least one TCI state ID.

25. The apparatus of claim 23, further comprising means for receiving, based on the transmitted RRC reconfiguration sidelink message, an RRC reconfiguration sidelink response message from the second UE, wherein the M beam training resources are selected based on the received RRC reconfiguration sidelink response message.

26. The apparatus of claim 19, wherein the first subset of beam training resources and the second subset of beam training resources are one of time division multiplexed or frequency division multiplexed.

27. The apparatus of claim 19, further comprising means for adjusting a partition for the first subset of beam training resources and a second subset of beam training resources based on a corresponding determined reference signal received power (RSRP) on each of the first subset of beam training resources and the second subset of beam training resources such that a first size of the first subset of beam training resources is increased and a second size of the second subset of beam training resources is decreased or such that the first size of the first subset of beam training resources is decreased and the second size of the second subset of beam training resources is increased.

28. A non-transitory computer-readable medium storing computer executable code, the computer executable code when executed by at least one processor of a first user equipment (UE) causes the at least one processor to:
   determine to perform beam training with a second UE in a set of beam training resources that is semi-statically configured as part of a beam training occasion, the set of beam training resources including a first subset of beam training resources for UEs without a radio resource control (RRC) connection with a UE associated with the beam training and a second subset of beam training resources for UEs with an RRC connection with the UE associated with the beam training, the first subset of beam training resources and the second subset of beam training resources being non-overlapping;
   determine whether the first UE is RRC connected with the second UE; and
   perform beam training in the first subset of beam training resources based on a determination that the first UE is not RRC connected with the second UE or in the second subset of beam training resources based on a determination that the first UE is RRC connected with the second UE.

* * * * *